Nov. 18, 1924.

G. F. HINRICHS

POULTRY PACKING

Filed Sept. 23, 1922

1,516,012

INVENTOR.

BY George F. Hinrichs

ATTORNEY.

Patented Nov. 18, 1924.

1,516,012

UNITED STATES PATENT OFFICE.

GEORGE F. HINRICHS, OF NEW YORK, N. Y.

POULTRY PACKING.

Application filed September 23, 1922. Serial No. 590,106.

*To all whom it may concern:*

Be it known that I, GEORGE F. HINRICHS, a citizen of the United States, residing at New York, county of New York, and State of New York, have invented certain new and useful Improvements in Poultry Packing, of which the following is a specification.

This invention relates to the packing of poultry, as for instance, chickens, broilers, squabs, ducks, geese and turkey or similar domestic fowls for food purposes, and it is the principal object of the invention to provide a novel method of arranging and packing the same in boxes or similar containers in such a manner that they present a distinctive wholesome, tempting and appetizing appearance when the containers are opened for display.

Another object of my invention is the provision of a novel manner of packing poultry by interlocking their limbs and packing their bodies in such a manner that any displacement or shifting of the contents of the containers during transportation is positively avoided in order to ensure a safe conveyance and to prevent damage to the goods which would make them less desirable for marketing purposes.

A further object of the invention is the provision of a distinctive and novel manner of affixing labels to the poultry packed according to my invention for allowing a ready and convenient inspection and identification of the respective brands.

A still further object of the invention is the provision of air spaces in the containers for the free circulation of air.

These and other objects of my invention will become more fully known as the description thereof proceeds, and will then be specifically pointed out in the appended claims.

My invention may be utilized for the packing of any poultry, birds or fowls for marketing purposes, but for simplicity of description, I will hereinafter refer only to poultry, but I do not desire to be limited by such reference.

In the accompanying drawing, forming a material part of this disclosure, and illustrating the preferred way of carrying out my invention, Figure 1 is a front view of a packing box with its cover removed, illustrating my novel and distinctive way of packing poultry.

Figure 1:
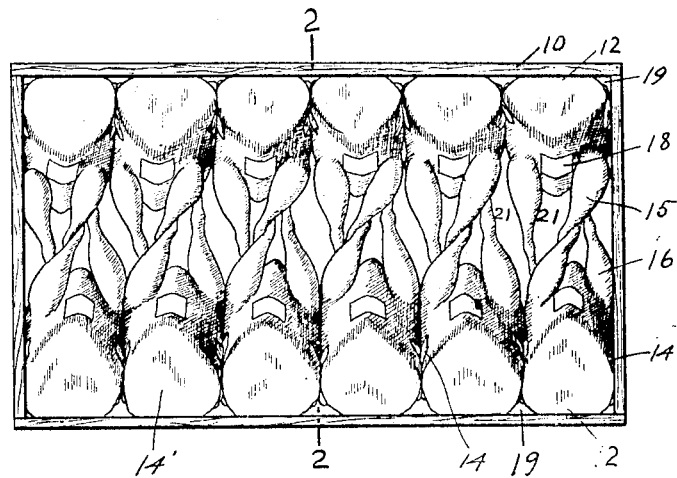
Figure 2:
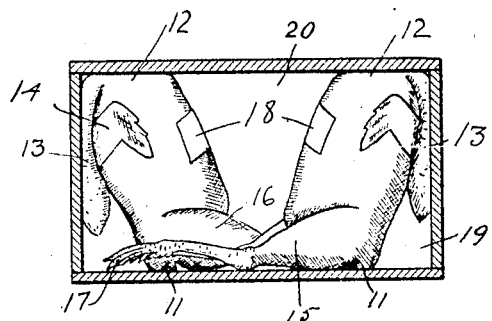
Figure 2 is a cross section through the box on line 2—2 of Figure 1.

In carrying my invention into practice, I preferably use a box or container 10 of any suitable material and form adapted to hold, as for instance in the present case, a dozen chickens resting with the fleshy part of their tail ends 11 against one wall of the container, which for convenience is hereinafter termed the bottom of the container, while their neck parts or the flattened bases of these parts 12 rest against the opposite wall of the container hereinafter termed the top of the container, so that the chickens are in a quasi sitting posture, with their necks 13 hanging down along the back of the bodies and their wings 14 resting against the sides of their bodies, bringing the flattened chest 14' of the bird to the surface with their breasts facing each other.

The legs 15, 16 of oppositely arranged pairs of the poultry are alternately arranged in the manner illustrated in Figure 1 so that the feet 17 of one fowl rest against the underside of the upper part of the legs of the opposite fowl.

Tags or labels 18 are attached to the breast of each chicken in such a manner that upon removal of the cover the specific brand is readily discernible.

A plurality of air spaces 19, 20, 21 are left between the birds and the container, and between the single rows of birds as well as the single birds of each row.

Figure 3:
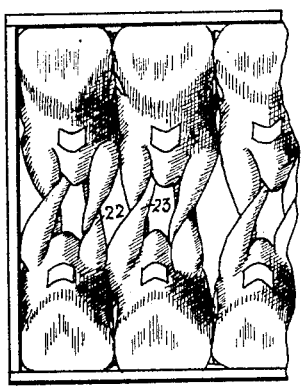
Figure 3 is a fragmentary view similar to Figure 1, illustrating a modified form of my invention.

According to the modified form of my invention illustrated in Figure 3, the legs of each pair of oppositely disposed chickens in the two rows are entwined in the manner illustrated at 22 and 23 respectively, while the posture of the other parts is the same as described above with respect to the illustration in Figure 1.

According to the invention above described I provide a package of packed fowls capable of being shipped and safely placed on display in an attractive condition without disturbance to the packed fowls.

Where reference is made to the bottom of the container it is to be understood that I refer to the wall which is engaged by the tail ends of the fowls. The opposite wall is termed the top of the container although obviously the box is capable of being turned with either side up in packing or during shipment.

It will be clear that changes may be made in the general arrangement of packing and the minor details of carrying my invention into practice without departing from the scope and spirit of my invention, as I desire the specific way of carrying out my invention illustrated in the accompanying drawing to be considered merely in an illustrative sense instead of a limiting one and desire the benefit of all modifications within the scope of the appended claims.

What I claim as novel and desire to secure by Letters Patent is—

1. A shipping and display package comprising a container containing a plurality of birds in sitting position placed in opposite rows, thereby providing a free open space between two rows of birds, the tail ends of the sitting birds in engagement with the bottom of the container, said package embodying means cooperating with a mutually sustaining relation between the opposite rows of birds for maintaining the bodies of the birds in position extended upwardly from said bottom.

2. As an article of commerce, a package comprising a container containing a plurality of birds in sitting position placed in opposite rows, thereby providing a free open space between two rows of birds, the tail ends of the sitting birds in engagement with the bottom of the container, and the neck ends in engagement with the top of the container, parts of said birds being placed in engagement whereby the birds will be maintained in sitting position.

3. As an article of commerce, a package comprising a container containing a plurality of birds in sitting position placed in opposite rows, thereby providing a free open space between two rows of birds, the tail ends of the sitting birds in engagement with the bottom of the container, parts of the backs of the birds engaging the sides of the container, and the legs of the birds in opposite rows being interspersed.

4. As an article of commerce, a package comprising a container containing a plurality of birds in sitting position placed in opposite rows, thereby providing a free open space between two rows of birds, the tail ends of the sitting birds in engagement with the bottom of the container, and the neck ends in engagement with the top of the container, the legs of the birds of one row being placed beneath parts of the birds of the opposite row.

5. A shipping and display package comprising a container containing a plurality of birds in sitting position placed in opposite rows, thereby providing a free open space between two rows of birds, the tail ends of the sitting birds in engagement with the bottom of the container, the necks of said birds being concealed by their bodies, said package embodying means cooperating with a mutually sustaining relation between the opposite rows of birds for maintaining the bodies of the birds in position extending upwardly from said bottom.

6. A shipping and display package comprising a container containing a plurality of birds in sitting position placed in opposite rows, thereby providing a free open space between two rows of birds, the tail ends of the sitting birds in engagement with the bottom of the container, said package comprising means cooperating with a mutually sustaining relation between the opposite rows of birds for maintaining the bodies of the birds in upwardly extended position, said birds having affixed to their breasts labels divulging the brands of said birds.

7. A shipping and display package comprising a container containing a plurality of birds in sitting position placed in opposite rows, thereby providing a free open space between two rows of birds, the tail ends of the sitting birds in engagement with the bottom of the container, the opposite ends of said birds being in engagement with the top of the container, and the legs of certain of said birds being entwined.

8. A shipping and display package comprising a box containing a plurality of birds held in sitting position in opposite rows, the tail-ends of the sitting birds in engagement with the bottom of the box and the chests in engagement with the top of said box, the necks of the said birds arranged to hang down along the rear of the bodies, and with the legs of said birds interspersed with the legs of the birds in the opposite row.

9. A method of packing poultry consisting in arranging the bodies of the fowls in sitting position in separated opposite rows, placing their tail ends in engagement with the bottom, and their chests in engagement with the top of the packing container, and interspersing the legs of the fowls in opposite rows.

10. A method of packing birds consisting in arranging the bodies of the birds in sitting position side by side in two separated opposite rows within a container and in engagement with the walls of the container, and placing the feet of certain of the birds of one row to rest against the underside of birds in the opposite row.

11. A method of packing poultry consisting in arranging the fowls in sitting position in a plurality of oppositely separated disposed rows, placing their tail ends in engagement with the bottom, and their neck ends in engagement with the top of the packing container, placing their necks to hand down along the rear of their bodies, and interspersing the legs of fowls in oppposite rows.

12. A method of packing poultry in oppositely disposed rows consisting in arranging the fowls with their tail ends in engagement with the bottom, and their chests in engagement with the top of the packing container, arranging their necks to hang down in rear of their bodies, interspersing the legs of fowls in opposite rows and placing a label divulging the brand on the breast of certain of the fowls.

13. A method of packing birds consisting in arranging the birds in lateral engagement with each other in two separated opposite rows, placing the tail ends of the birds against the bottom, and the flattened chests against the top of the packing container, arranging the necks to engage the backs, and the wings against the bodies of the birds, and securing the legs of birds of opposite rows by placing the feet of birds in one row beneath the birds in the opposite row.

14. A method of packing poultry consisting in arranging a plurality of fowls in sitting position in opposite rows, thereby leaving a free open space between the breasts of opposite fowls, placing the tail ends of the birds in engagement with the bottom of the box, and sustaining the bodies of the fowls in substantially upright position, said fowls being sustained in part by the mutual relation of the opposite rows of birds.

In testimony whereof I have affixed my signature.

GEORGE F. HINRICHS.